Patented Feb. 27, 1940

2,191,818

UNITED STATES PATENT OFFICE 2,191,818

SUBSTANCE HAVING TANNING ACTION AND PROCESS OF PRODUCING THE SAME

Edmund Stiasny, Helsingborg, Sweden, assignor, by mesne assignments, to Röhm & Haas Company, Philadelphia, Pa., a corporation of Delaware No Drawing. Application December 28, 1937, Serial No. 182,158. In Germany January 27, 1937

16 Claims. (Cl. 260—70)

The present invention relates to new substances having tanning action and a process of producing same.

It is already known that phenol sulphonic acids or other aromatic sulphonic acids can be converted by condensation with formaldehyde into products having tanning properties. It has also been proposed to convert phenol sulphonic acids into tanning agents by treatment with urea and formaldehyde, in some cases with the addition of aromatic hydroxy-carboxylic acids.

I have now found that tanning agents having especially advantageous properties are obtained by treating sulphonic acids of polynuclear aromatic hydrocarbons, if desired in admixture with other aromatic sulphonic acids, with urea and formaldehyde and rendering the resulting products water soluble, when they are insoluble or insufficiently soluble, by the action of aromatic sulphonic acids and formaldehyde or condensation products obtainable from the same. Among sulphonic acids of aromatic hydrocarbons suitable for the process according to this invention there may be mentioned in particular naphthalene sulphonic acid, methylnaphthalene sulphonic acid, anthracene sulphonic acid, phenanthrene sulphonic acid and the like. Mixtures of the said sulphonic acids with each other or with other sulphonic acids, as for example sulphonic acids of phenol, cresols, xylenols or the like, may also be used. The said sulphonic acids are treated with urea and formaldehyde and the relative proportions of the single components to be used may be varied; for example 1 molecular proportion of urea and 2 molecular proportions of formaldehyde or more may be used for 2 molecular proportions of aromatic sulphonic acid.

The addition of the formaldehyde preferably takes place at moderate temperature; generally speaking temperatures between 30° and 50° C. are used. The action of aromatic sulphonic acids, as for example phenol sulphonic acids, to increase the solubility is advantageously carried out at the elevated temperature, as for example at from 60° to 80° C. After the addition of formaldehyde, preferably effected at moderate temperature, it is frequently advantageous to heat again to higher temperatures, as for example from 60° to 80° C.

For the said after-treatment for increasing the solubility there may be used for example phenol sulphonic acids or anthracene sulphonic acids either alone or in admixture with each other, or the condensation products obtainable therefrom. Mixtures of naphthalene sulphonic acid and anthracene sulphonic acid or the condensation products formed from these mixtures by the action of formaldehyde may also be used.

In many cases the sulphonic acids of polynuclear aromatic hydrocarbons, urea, formaldehyde, if desired with an addition of aromatic sulphonic acids or their condensation products with formaldehyde, may be mixed with each other and heated to moderately high temperatures, whereby water-soluble products are directly obtained. The amount of aromatic sulphonic acids and formaldehyde or the like to be used in the after-treatment is generally speaking dependent on the degree of solubility desired.

In many cases it is of special advantage to add aromatic hydroxy-carboxylic acids, as for example salicylic or cresotinic acid, before or during the condensation of the sulphonic acids of polynuclear aromatic hydrocarbons with urea and formaldehyde. Also in the after-treatment of insufficiently water-soluble condensation products with aromatic sulphonic acids and formaldehyde it is frequently advantageous to add aromatic hydroxy-carboxylic acids in order to obtain products of specially good solubility.

The products obtained according to this invention may be used as tanning agents either directly or after neutralization to the desired degree of acidity. The neutralization may be effected for example with caustic soda solution, caustic potash solution, soda solution or ammonia solution. In the said manner there are obtained tanning agents which have a high tanning action and are capable of converting hides into well-plumped white leather. A special advantage of the products obtained resides in the fact that a good tanning action is obtained even at a pH-value above 3.

The following examples will further illustrate how the said invention may be carried out in practice but the invention is not restricted to these examples. The parts are by weight.

Example 1

15 parts of naphthalene sulphonic acid melt are mixed with 7 parts of water and 5 parts of urea and there are then added 10 parts of 30 per cent formaldehyde while avoiding marked rise in temperature. The resulting insoluble, colorless mass, after addition of 40 parts of cresol sulphonic acid, is then brought into solution by heating to about 70° C., whereupon 10 parts of 30 per cent formaldehyde are added after cooling. The reaction product then has added to it caustic soda solution until it becomes water-soluble. The resulting aqueous solution has a strong precipitating power for gelatines and is eminently suitable for converting hides into white leather.

Example 2

The product obtained from naphthalene sulphonic acid with water, urea and formaldehyde according to Example 1 is heated to 70° C., after the addition of 40 parts of anthracene sulphonic acid, until dissolution has taken place. After cooling, 10 parts of 30 per cent formaldehyde are added to the reaction product. The water-soluble product may be used directly for tanning.

Example 3

15 parts of naphthalene sulphonic acid melt are mixed with 7 parts of water, 4 parts of urea, 3 parts of salicylic acid and 10 parts of 30 per cent formaldehyde. After adding 40 parts of cresol sulphonic acid, the mixture is brought into solution by heating and then 10 parts of 30 per cent formaldehyde are added after cooling. The mass which gradually becomes solid is soluble in cold water and may be used with advantage for tanning, if necessary after neutralization.

Example 4

15 parts of naphthalene sulphonic acid melt, 6 parts of urea and 2 parts of salicylic acid are dissolved hot in 15 parts of water and 12 parts of 30 per cent formaldehyde are added after cooling. The resulting reaction product is brought into solution by a hot homogeneous mixture of 50 parts of cresol sulphonic acid, 8 parts of urea and 2 parts of salicylic acid and, after cooling, rendered water-soluble with 30 parts of 30 per cent formaldehyde. The desired degree of acidity is then established with caustic soda solution. The resulting product is eminently suitable for tanning.

Example 5

20 parts of naphthalene sulphonic acid melt are well mixed at 60° C. with 10 parts of water, 6 parts of urea and 4 parts of cresotinic acid and 15 parts of 30 per cent formaldehyde are added after cooling. 30 parts of cresol sulphonic acid are added to the reaction mixture and the whole heated for ¼ hour to from 60° to 80° C. The product thus formed is water-soluble and may be used with great advantage for tanning either directly, or if necessary after neutralization with caustic soda solution, or after a treatment with 10 parts of 30 per cent formaldehyde and subsequent neutralization.

Example 6

A mixture of 20 parts of anthracene sulphonic acid, 10 parts of water, 3 parts of urea, 3 parts of salicylic acid and 12 parts of 30 per cent formaldehyde is heated to from 70° to 80° C. for an hour and then neutralized with caustic soda solution until water-solubility occurs. The aqueous solution has a strong precipitating power for gelatines and has a very good tanning action.

Example 7

26 parts of anthracene sulphonic acid, 13 parts of water, 4 parts of urea, 4 parts of cresotinic acid and 13 parts of 30 per cent formaldehyde are mixed with each other and heated to 40° C. After allowing to stand for several hours, the reaction product is neutralized with concentrated ammonia solution. A product having good tanning action is thus obtained.

Example 8

A mixture of 7 parts of naphthalene sulphonic acid melt, 3 parts of water, 30 parts of cresol sulphonic acid and 7.5 parts of urea is stirred until the urea has passed completely into solution. Then 30 per cent formaldehyde (about 20 parts) is added to the reaction mixture until water-solubility has occurred. The product is then neutralized to the desired acidity with caustic soda solution. The product may also be neutralized beyond the desired acidity with caustic soda solution and then acidified again with any desired acid, as for example formic acid.

Example 9

A mixture of 20 parts of naphthalene sulphonic acid melt, 20 parts of anthracene sulphonic acid, 20 parts of water, 5 parts of urea and 5 parts of salicylic acid is stirred for 20 minutes at about 50° C. After cooling, 12 parts of 30 per cent formaldehyde are added to the reaction product, strong rise in temperature being avoided. The whole is then heated for an hour at from 60° to 70° C. and, after cooling, the reaction product is neutralized with caustic soda solution until water-solubility occurs. A good tanning agent is thus obtained.

What I claim is:

1. The process of producing substances having tanning action, which comprises treating a sulphonic acid of a polynuclear aromatic hydrocarbon with urea and formaldehyde and improving the water-solubility of the resulting product by the action of an aromatic sulphonic acid and formaldehyde.

2. The process of producing substances having tanning action, which comprises treating a sulphonic acid of a polynuclear aromatic hydrocarbon with urea and formaldehyde and improving the water-solubility of the resulting product by the action of a condensation product comprising an aromatic sulphonic acid.

3. The process of producing substances having tanning action, which comprises treating a sulphonic acid of a polynuclear aromatic hydrocarbon in admixture with another aromatic sulphonic acid, with urea and formaldehyde.

4. The process of producing substances having tanning action, which comprises treating a sulphonic acid of a polynuclear aromatic hydrocarbon in admixture with another aromatic sulphonic acid, with urea and formaldehyde and improving the water-solubility of the resulting product by the action of an aromatic sulphonic acid and formaldehyde.

5. The process of producing substances having tanning action, which comprises treating a sulphonic acid of a polynuclear aromatic hydrocarbon in admixture with another aromatic sulphonic acid, with urea and formaldehyde and improving the water-solubility of the resulting products by the action of a condensation product comprising an aromatic sulphonic acid.

6. The process of producing substances having tanning action, which comprises treating a mixture of a naphthalene sulphonic acid and a phenol sulphonic acid, with urea and formaldehyde.

7. The process of producing substances having tanning action, which comprises treating a mixture of a naphthalene sulphonic acid and an anthracene sulphonic acid with urea and formaldehyde.

8. The process of producing substances having tanning action, which comprises treating a sulphonic acid of a polynuclear aromatic hydrocarbon in admixture with another aromatic sulphonic acid and an aromatic hydroxy-carboxylic acid, with urea and formaldehyde.

9. Substances having tanning action obtainable according to claim 1.

10. Substances having tanning action obtainable according to claim 2.

11. Substances having tanning action obtainable according to claim 3.

12. Substances having tanning action obtainable according to claim 4.

13. Substances having tanning action obtainable according to claim 5.

14. Substances having tanning action obtainable according to claim 6.

15. Substances having tanning action obtainable according to claim 7.

16. Substances having tanning action obtainable according to claim 8.

EDMUND STIASNY.